United States Patent Office 3,359,146
Patented Dec. 19, 1967

3,359,146
METHOD OF PRODUCING GYPSUM ARTICLES HAVING IMPROVED STRENGTH TO DENSITY RATIO
Marvin K. Lane, Chicago, and John S. Sheahan, Hoffman Estates, Ill., assignors to United States Gypsum Company, Chicago, Ill., a corporation of Illinois
No Drawing. Filed Mar. 27, 1964, Ser. No. 355,492
3 Claims. (Cl. 156—43)

ABSTRACT OF THE DISCLOSURE

The process of making gypsum casts having an increased strength to density ratio by the steps of providing a calcined gypsum which disintegrates upon mixing with water, forming a slurry and mixing it until the calcined gypsum particles disintegrate, adding accelerator to the slurry and casting it while the calcined gypsum has a combined moisture content of less than about 9% by weight.

---

This invention relates to cast gypsum products and to a process for increasing their strength without increasing their density. More particularly, this invention relates to a process of producing gypsum plasterboard, lath, partition tile, roof plank and floor tile having increased dry compressive strength at any particular dry density, thus making it possible to reduce the amount of calcined gypsum and other materials used in producing cast gypsum products while yet maintaining the dry compressive strengths normally attainable only at higher densities.

The process of this invention is particularly well suited for the the use in manufacturing of paper covered gypsum plasterboard, wallboard and the like, although it is not limited thereto.

The manufacture of cast gypsum articles is well-known in the art, and it is generally recognized as desirable to produce a lightweight product, provided this can be accomplished with no sacrifice in strength and by a process adaptable for operation on modern, high speed machinery. The lighter weight products consume a smaller quantity of materials, cost less to distribute, and contribute to more satisfactory performance on the job through easier handling, etc.

In the commercial manufacture of paper covered gypsum board, a calcined gypsum slurry is usually prepared, the ingredients being added to a mixer and after a few seconds deposited onto a paper liner moving under the mixer. In a typical installation, the ground calcined gypsum rock is added to the mixer along with gauging water. Other ingredients added simultaneously may include an accelerator such as freshly ground cast gypsum block, potassium sulphate, etc., a cereal grain binding agent and cellulose fiber reinforcing material. There may also be added a premixed tenacious foam to reduce the density of the slurry and the gypsum board made from it. A cover sheet is added, the board is shaped to proper dimensions and passed into the drying kiln about 10 to 15 minutes after the gypsum core was cast. It is necessary for maximum strength in the core that setting or hydration be completed before the board enters the kiln. It is equally important, however, that the paper liners be in place and the board shaped to its final dimensions before any appreciable amount of hydration has taken place.

Paper covered gypsum wallboard currently being marketed in a ½" thickness weighs between 1850 and 2150 pounds per thousand square feet. At the low end of this range, the gypsum core has a density of about 44 pounds per cubic foot, and a compressive strength of about 550 pounds per square inch. However desirable it might be to produce a lighter weight board, a reduction in density by a prior art process has always been accompanied by a corresponding and undesirable reduction in strength.

It is the object of this invention, therefore, to provide a process for achieving a lower density set gypsum plaster article without any sacrifice in compressive strength. It is another object of this invention to provide increased dry compressive strength in set gypsum plaster without any increase in the dry density of said set gypsum.

A further object of this invention is to provide a process for the manufacture of a set gypsum plaster article having an enhanced strength-density relationship.

A still further object of this invention is to provide a process for achieving a lower density plasterboard without any sacrifice in compressive strength.

It is another object of this invention to provide increased dry compressive strength of the set gypsum core of a plasterboard, without any increase in the dry density of that core.

A further object of this invention is to provide a process for manufacturing lightweight gypsum articles from calcined gypsum which utilizes a greater proportion than heretofore of the strength potentially available in the gypsum crystal.

A further object of this invention is to provide a process for the manufacture of a lightweight gypsum article from calcined gypsum rock by means of which a greater percentage than heretofore of the strength of the gypsum crystal contributes effectively to the strength of said lightweight article.

Another object of this invention is to provide a process for the production of cast gypsum articles with an improved strength to density ratio which is adaptable to existing machinery.

A further object is to provide cast gypsum articles with an improved compressive strength to density ratio.

This invention is based in part upon the discovery that the strength of set gypsum plaster increases as the particle size of the hemihydrate prior to setting decreases, and in part on the provision of a novel process to enable the advantage of the discovery to be embodied in finished gypsum products. The ability to develop very fine particles, particularly in the presence of water as in a slurry, is a property which we shall call "Dispersibility" and is affected by a number of operations which go into the preparation of the calcined gypsum before its contact with the gauging water to form a slurry. The disintegration of the particles can be observed with the naked eye by dropping particles of calcined gypsum into cold water, and its extent may be determined by mixing the calcined gypsum briefly with water and then interrupting the hydration reaction by dilution of the slurry with ethanol or isopropanol and quickly filtering, washing with alcohol and drying at about 110° F. The particle size before and after slurrying with the water may be measured by the Blaine air permeability apparatus (ASTM–C–204). The source and purity of the gypsum, and the fineness to which reduced before and after calcination, affect this property, and a major influence is exerted by the type of calcination utilized. The most dispersible calcined gypsums are those known as the "beta" variety which are produced by atmospheric pressure calcination in a kettle or kiln, the particles of which contain many cracks and incipient fractures which cause the particles to rupture upon contact with water. (Kelly, K. K., Southard, J. C. and Anderson, C. T., U.S. Bureau of Mines Tech. Paper 625, "Thermodynamic Properties of Gypsum and Its Dehydration Products.")

The calcined gypsum considered most desirable for the process of our invention is that produced from a rock having a high percentage of calcium sulfate dihydrate, that is more than about 85% and preferably above about 88%, and having a low percentage of salt so that it is not "aridized" or chemically pre-aged in the calcination step. In some cases, it has been found desirable to wash the rock to lower the salt content before calcination. Precipitated gypsum of adequate purity may also be used.

As the art of calcination improved through the advantageous employment of new knowledge as it evolved, calcined gypsums of increased dispersibility were produced. Unfortunately, when attempts were made to fabricate cast gypsum articles from these new highly dispersible calcined gypsums, the potential dispersibility was not realized and the improvement in strength of the cast articles was less than had been anticipated. Moreover, the attempts to obtain slurries in which the calcined gypsum was highly dispersed gave rise to some problems which either did not exist before or were so minor that they were overlooked in that the setting time of the slurry decreased and was to some extent unpredictable so that occasionally some of it would set while still in the mixer, a condition which precluded successful commercial utilization. According to our invention, this difficulty has been overcome by first dispersing the calcined gypsum and then, only after it has been dispersed, do we adjust its setting time by the addition of accelerator.

The accelerators which may be used are chemical accelerators, such as potassium sulphate, aluminum sulphate, ammonium sulphate and various forms of finely divided gypsum dihydrate, such as land plaster, freshly ground cast gypsum block, and "Microfloc." "Microfloc" is an especially desirable accelerator and is prepared by adding calcined gypsum to a quantity of water considerably in excess of that needed for hydration, and stirring until after hydration has been completed. The product consists of very fine needles, and it should be used when freshly prepared and highly active, before the larger crystals grow at the expense of the smaller and/or the sharpness of the crystals is lost.

Activity or efficiency of accelerators varies widely and consequently this factor must be kept in mind when determining the quantity to be employed. For a chemical accelerator such as potassium sulfate, about 2 pounds per pounds per ton (0.1% by weight) of hemihydrate may possibly be sufficient, whereas with a less active accelerator such as land plaster, 25 pounds or more per ton may be necessary. A quantity of accelerator from about 0.2% to about 0.8% by weight based on the weight of the hemihydrate is particularly desirable. Whatever the type of accelerator employed, the amount usually should not be so great that set is initiated less than about 1½ minutes after its addition and the amount should be adequate so that the temperature rise set should be completed by about 15 minutes after accelerator addition and preferably between 10 and 12 minutes after addition. The quantity of accelerator may also be determined with reference to the percent of combined moisture of the solids in the slurry as cast, it being desirable to limit this to less than about 9% and preferably to less than about 7.6% by weight.

If the hydration is permitted to proceed in the mixer beyond about 9% combined moisture, or if the slurry begins to get lumpy, the set gypsum acts as a filler or aggregate which does not contribute fully to the strength of the cast article.

In the commercial manufacture of plasterboard and other gypsum articles, the object of achieving a lightweight product is accomplished by incorporating a pregenerated tenacious foam directly into the calcined gypsum and water slurry at the time it is initially mixed. This is a procedure that is well known to the art and is disclosed in Roos Patent No. 2,017,022 dated Oct. 8, 1935, and in Roos Patent No. 2,080,009, dated May 11, 1937. In accordance with the disclosures in these patents, a pregenerated tenacious foam is admixed with the calcined gypsum and water under conditions to form a foamed slurry which may be used in the manufacture of plasterboard to produce a product having a lightweight cellular core. One problem associated with the plasterboard mixing operation is that while there must be sufficient mixing or blending of the foam, gypsum and water to achieve a uniform slurry mixture, mixing must be comparatively mild when the foam is present in order that the foam is not substantially destroyed during mixing.

Various reinforcing materials such as cellulose, synthetic plastic and glass reinforcing fibers and cereal grain binder such as flour and starch may be incorporated directly into the slurry at the time of initial mixing to impart desired properties to the finished gypsum product. These materials, however, are not necessary for the practice of our invention and we prefer to limit them to less than about 5% of the weight of the calcined gypsum and desirably to less than about 2%. It should be noted that they have little if any effect on the set time of the gypsum.

Because strength is not directly proportional to density within the range of values of interest in the production of lightweight gypsum products, a series of runs was made by the procedure of Example 1 to obtain castings with a range of densities so that a standard of comparison would be available. The results were a very close fit to the equation $$S = A \cdot 10^{0.0297D}$$

wherein S is the compressive strength in pounds per square inch, A is the constant 29.02 and D is the density in pounds per cubic foot. The curve appears to be quite valid over a range of densities from about 35 pounds per cubic foot to about 55 pounds per cubic foot but beyond this range of density error may possibly occur. Illustrative of the values obtained are the following:

| Lbs./cu. ft.: | P.s.i. |
| --- | --- |
| 40 | 450 |
| 45 | 624 |
| 50 | 900 |

As will be demonstrated in the following examples, cast gypsum articles, with strength to density ratios exceeding these values, can be obtained through the practice of our invention. By dispersing the calcined gypsum particles under conditions more nearly ideal for that operation, and then adding accelerator to the slurry, products were obtained whose strength exceeded that calculated from the formula by about 10%.

Example 1

The following will illustrate the procedure of the standard run.

The mixer employed was a Hobart Model A–200 equipped with a wire whip agitator, manufactured by the Hobart Manufacturing Company, Troy, Ohio. About 1500 cc. of gauging water was placed in the 12-quart mixing bowl in preparation for a run, the exact amount being determined empirically to give the proper consistency to the slurry. Just prior to starting the agitator, 20 grams of ground gypsum block accelerator, 1600 grams of calcined rock, 21.6 grams of paper fiber reinforcing agent, 10.8 grams of a cereal grain binding agent, and 2.3 grams of a dispersing agent or consistency reducer, such as Orzan "A" were added. Orzan "A" is an ammonium lignosulfonate, containing wood sugars, and is manufactured by Crown Zellerbach Corporation. The mixer was turned on at 365 r.p.m., and after five seconds, about 650 cc. of foam with a density of 13 pounds per cubic foot were added and the mixing continued for a total of 20 seconds. Five test cubes were cast and as soon as they had set, they were taken from the molds and placed in a kiln at 350° F. where they were dried to 70% of their wet weight. Drying was then completed at 110° F. and the compressive strength and density measured in the usual manner. The average of the five cubes was reported as the result of the run.

At the time the cubes were cast about one part of slurry was added to two parts of reagent grade isopropyl alcohol, with rapid stirring, so that the isopropyl alcohol interrupted the hydration. The particles were largely the hemihydrate and were filtered off, washed with isopropanol and dried at 110° F. The cellulose fiber in the dry product was removed by brushing through a No. 50 sieve and the dried and sieved powder was analyzed by a standard procedure for combined moisture (ASTM Method C–471) and the surface area, and therefore particle size, was determined by the Blaine air permeability apparatus which is described in ASTM method C–204.

Referring to Table I, the results shown for Run. No. 1 were obtained by following the procedure of Example 1 using a good quality calcined gypsum. For Run No. 10, the procedure of Example 1 was repeated using good calcined gypsum rock from another source. The strengths and densities approximated those obtained in preparing the standard samples.

*Example 2*

The increased strength obtainable with greater fineness, in this case as a result of careful dry grinding, is demonstrated by Run 2, in which the procedure of Example 1 was repeated using the same calcined gypsum with the exception that it had been ground to a much finer particle size so that dry fineness now was 12,500 square centimeters per gram. This resulted in increased slurry fineness, a shorter set time and produced a surprising increase in the strength of the cast product. Run 11 was made with the same calcined gypsum of Run 10 after it had been ground to about 12,000 square centimeters per gram, further illustrating the increase in strength realized by increasing the slurry fineness before casting the gypsum product.

TABLE I.—EFFECT OF GRIND ON CAST STRENGTH

|  | Run 1 | Run 2 | Run 10 | Run 11 |
| --- | --- | --- | --- | --- |
| Fineness, Dry | 4,000 | 12,500 | 4,000 | 12,040 |
| Fineness, Slurry | 13,000 | 16,700 | 10,700 | 16,600 |
| Water:Hemihydrate Ratio | 0.93 | 1.03 | 0.91 | 1.03 |
| Percent Hydration as Cast | 7.5 | 9.2 | 7.4 | 8.5 |
| Set, Minutes | 15 | 12.5 | 15 | 13 |
| Strength, Percent of Standard | 103 | 125 | 97 | 115 |

*Example 3*

Using calcined gypsums from different sources, Runs 30 and 40 were made according to the standard procedure of Example 1. Duplicate runs, No. 31 and 41, were made except that the ground gypsum block accelerator was not added until several seconds, 8 and 5 respectively, after mixing began. As reported in Table II, only a very slight increase in slurry fineness was measured, but the increase in strength was substantial and was accompanied by an increase in accelerator efficiency, as indicated by the reduction in set time

TABLE II.—EFFECT OF DELAYED ACCELERATOR ADDITION

|  | Run 40 | Run 41 | Run 30 | Run 31 |
| --- | --- | --- | --- | --- |
| Fineness, Dry | 5,000 | 5,000 | 4,500 | 4,500 |
| Fineness, Slurry | 14,000 | 14,700 | 14,500 | 14,500 |
| Water:Hemihydrate Ratio | 0.90 | 0.90 | 0.90 | 0.90 |
| Accelerator Delay, sec | 0 | 5 | 0 | 8 |
| Percent Hydration as Cast | 6.8 | 6.75 | 7.5 | 7.8 |
| Set, Minutes | 13 | 10.5 | 13.0 | 11.0 |
| Strength, Percent | 91 | 107 | 95 | 110 |

The advantages of our process were also obtained with a continuous type mixer customarily used for preparing slurry for the manufacture of plasterboard in commercial operations. For this operation a two stage mixer employed, the first stage providing high intensity agitation with the rotor operating at 445 r.p.m. followed by a gentle mixing stage operating at 112 r.p.m. The calcined gypsum, gauging water, cereal grain binder cellulose fiber and consistency modifier were fed to the first stage where the intense agitation promoted a high degree of dispersion in the slurry. The foam and accelerator were admixed to the slurry in the second stage where the gentle action favored the optimum utility of these ingredients.

The accelerator was Microfloc, about 6.8 pounds per ton of hemihydrate being used initially. Because of the increase in accelerator efficiency resulting from our process, the amount was subsequently reduced to 5.3 pounds per ton. In addition to increasing the strength of the cast gypsum the absence of accelerator in the first mixer stage had the further beneficial effect in a continuous mixer of cleaner mixer operation and eliminated the formation of dry mix lumps.

It will be readily apparent from the foregoing that we have invented a novel process of great commercial importance, which will enable far lighter and/or far stronger gypsum plasterboard products and other gypsum castings to be made.

Besides producing increased strength, our method of delayed addition of accelerator and/or foam yields greater additive efficiency so that for a given temperature rise set time an density, less accelerator and foam respectively are required, resulting in added economies in the operation.

It will be noted especially that though the slurry fineness has reached rather high values through these and other techniques, the percent hydration of the slurry as cast has been adequately controlled at a desirable level.

As earlier indicated, the slurry components and the mounts required for making plasterboard and other cast gypsum articles are well known in the art. To obtain the beneficial results of our invention it ordinarily will not be necessary to change the proportions of the ingredients but some modification may be made dependent on the actual strength and density results achieved at a particular operating plant. Thus, if a plant is having difficulty meeting minimum strength specifications for wallboard, it may be unnecessary to change amounts or kinds of ingredients, but by operating according to the process of our invention, the strength of the board will be increased sufficiently to eliminate the former difficulty. At other plants it may be found that the great increase in strength of the gypsum board or other articles may enable a significant reduction to be made in the quantity of calcined gypsum and water used and the greater efficiency of our process may enable adjustments to be made in the quantities of foam and accelerator required.

While one particular embodiment of this invention is shown above, many modifications therein may be made and it is thus contemplated to cover any such modifications as fall within the true spirit and scope of this invention by the appended claims.

We claim:
1. The process of manufacturing a cast gypsum article having increased dry compressive strength at any particular dry density which comprises the steps of providing a source of finely divided calcined gypsum capable of disintegration in water, forming an aqueous slurry of such calcined gypsum, mixing said slurry for a time and at an intensity sufficient to disintegrate the same into particles whose Blaine surface area is greater than that of the provided stucco and is at least about 12,000 square centimeters per gram, incorporating at least about 0.1% by weight of an accelerator with agitation to said slurry of not more than about 15 minutes, and casting the slurry while the combined moisture content of the calcined gypsum is less than about 9% by weight.

2. The process of claim 1 wherein the final dry density of the cast gypsum article is adjusted to between about 35 to 50 pounds per cubic foot by adding a premixed tenacious foam to the gypsum slurry after the disintegration step.

3. In a method of producing gypsum board having increased dry compressive strength at any particular dry density and having a dry core density of from about 35 to 50 pounds per cubic foot, wherein a foamed calcined gypsum slurry is deposited between paper cover sheets, permitted to set, and dried, the improvement which comprises producing said slurry by providing a source of finely divided calcined gypsum capable of disintegration in water, forming an aqueous slurry of such calcined gypsum, mixing said slurry for a time and at an intensity sufficient to disintegrate the same into particles whose Blaint surface area is greater than that of the provided stucco and is at least about 12,000 square centimeters per gram, incorporating at least about 0.1% by weight of an accelerator and foam with agitation into said slurry in an amount sufficient to produce a temperature rise set of not more than about 15 minutes and casting the slurry between paper cover sheets, while the combined moisture content of the calcined gypsum is less than about 9% by weight.

References Cited
UNITED STATES PATENTS

| | | | |
|---|---|---|---|
| 1,909,465 | 5/1933 | Hansen et al. | 106—315 |
| 1,915,603 | 6/1933 | Gough | 156—39 |
| 1,999,158 | 4/1935 | Roos | 106—110 |
| 2,322,194 | 6/1943 | King | 106—88 |
| 2,862,829 | 12/1958 | Dixon et al. | 106—112 |
| 2,947,643 | 8/1960 | Kamlet | 106—109 |
| 2,980,548 | 4/1961 | Hampton | 106—118 |
| 3,262,799 | 7/1966 | McCleary et al. | 106—110 |
| 3,328,121 | 6/1967 | Shull | 106—110 |

TOBIAS E. LEVOW, *Primary Examiner.*

S. E. MOTT, *Assistant Examiner.*

UNITED STATES PATENT OFFICE
CERTIFICATE OF CORRECTION

Patent No. 3,359,146                      December 19, 1967

Marvin K. Lane et al.

It is hereby certified that error appears in the above numbered patent requiring correction and that the said Letters Patent should read as corrected below.

Column 3, line 44, strike out "pounds per"; column 5, line 75, after "mixer" insert -- was --; column 6, line 69, after "said slurry" insert -- in an amount sufficient to produce a temperature rise set --; column 7, line 14, for "Blaint" read -- Blaine --.

Signed and sealed this 21st day of January 1969.

(SEAL)
Attest:

Edward M. Fletcher, Jr.                      EDWARD J. BRENNER
Attesting Officer                            Commissioner of Patents